(12) United States Patent
Breitenbach et al.

(10) Patent No.: US 9,243,731 B2
(45) Date of Patent: Jan. 26, 2016

(54) PIPE CLAMP, IN PARTICULAR PROFILE CLAMP

(71) Applicant: NORMA GERMANY GMBH, Maintal (DE)

(72) Inventors: Gerrit V. Breitenbach, Karlstein (DE); Achim Kamp, Langenselbold (DE); Gerhard Wachter, Buedingen (DE); Jonathan Heywood, Hants (GB)

(73) Assignee: NORMA GERMANY GMBH, Maintal (DE)

( * ) Notice: Subject to any disclaimer, the term of this patent is extended or adjusted under 35 U.S.C. 154(b) by 22 days.

(21) Appl. No.: 13/938,716

(22) Filed: Jul. 10, 2013

(65) Prior Publication Data

US 2014/0028014 A1    Jan. 30, 2014

(30) Foreign Application Priority Data

Jul. 27, 2012    (EP) .................................... 12005476

(51) Int. Cl.
| F16L 25/00 | (2006.01) |
| F16L 23/10 | (2006.01) |
| F16L 23/08 | (2006.01) |
| F16B 41/00 | (2006.01) |

(52) U.S. Cl.
CPC ................. F16L 23/10 (2013.01); F16L 23/08 (2013.01); F16B 41/002 (2013.01)

(58) Field of Classification Search
USPC ............ 285/337, 365, 407, 420; 411/199
See application file for complete search history.

(56) References Cited

U.S. PATENT DOCUMENTS

| 5,720,086 A * | 2/1998 | Eliasson et al. ................. 24/279 |
| 2009/0172939 A1 | 7/2009 | Dole |

FOREIGN PATENT DOCUMENTS

| CN | 273663 | 3/2006 |
| CN | 102011906 | 4/2011 |
| DE | 88 06 714 | 8/1988 |
| FR | 2 863 335 | 6/2005 |
| GB | 447 963 | 5/1936 |
| JP | 7-38737 | 7/1995 |
| JP | 07-38737 | 7/1995 |
| JP | 11-141764 | 5/1999 |
| JP | 2003-269418 | 9/2003 |
| JP | 2005-003014 | 1/2005 |
| JP | 2009-506275 | 2/2009 |
| JP | 2009-197967 | 9/2009 |

(Continued)

OTHER PUBLICATIONS

European Search Report conducted in counterpart European Appln. No. 120 05476.2-2424 (Jan. 9, 2013) (with English language translation).

(Continued)

*Primary Examiner* — Aaron Dunwoody
(74) *Attorney, Agent, or Firm* — Greenblum & Bernstein, P.L.C.

(57) ABSTRACT

Pipe clamp and method for retaining a tensioning element in a tensioning head of the pipe clamp. The pipe clamp includes a clamp band having a first end with a first tensioning head and a second end with a second tensioning head, a tensioning element guidable guided through the first tensioning head and engageable with the second tensioning head, and a securing element structured and arranged in the first tensioning head to secure the tensioning element against loss and including a spring element structured and arranged to act between the tensioning element and the first tensioning head.

19 Claims, 3 Drawing Sheets

(56) References Cited

FOREIGN PATENT DOCUMENTS

| | | |
|---|---|---|
| JP | 2010-121708 | 6/2010 |
| JP | 2011-174600 | 9/2011 |
| WO | 03/069204 | 8/2003 |
| WO | 2007/024326 | 3/2007 |

OTHER PUBLICATIONS

Korean Office Action conducted in counterpart Korea Appln. No. 10-2013-0086285 (Jul. 9, 2014) (w/ English language translation).

Japanese Office Action conducted in counterpart Japanese Appln. No. 2013-124027 (Apr. 15, 2014) (with English language translation).

Japan Office Action conducted in counterpart Japan Appln. No. 2013-124027 (Dec. 2, 2014) (w/ English language translation).

Chinese Office Action conducted in counterpart China Appln. No. 201310280674.7 (Feb. 28, 2015) (w/ English language translation).

China Office Action conducted in counterpart China Appln. No. 201310280674.7 (Nov. 4, 2015) (w/ English language translation).

\* cited by examiner

PIPE CLAMP, IN PARTICULAR PROFILE CLAMP

CROSS-REFERENCE TO RELATED APPLICATIONS

The present application claims priority under 35 U.S.C. §119 of European Patent Application No. 12 005 476.2 filed Jul. 27, 2012, the disclosure of which is expressly incorporated by reference herein in its entirety.

BACKGROUND OF THE INVENTION

1. Field of the Invention

Embodiments of the invention relate to a pipe clamp, in particular a profile clamp, with a clamp band having a first end with a first tensioning head and a second end with a second tensioning head. A tensioning element is guided through the first tensioning head and is secured against loss by a securing element in the first tensioning head and the tensioning element is engagable with the second tensioning head.

2. Discussion of Background Information

A pipe clamp of the type generally discussed above is positioned around a pipe. The tensioning element, which is already guided through the first tensioning head, is then engaged with the second tensioning head and subsequently tightened. In this way, the clamp band is positioned around the pipe with a certain tension. If the pipe clamp is embodied or formed as a profile clamp, then the clamp band has roughly a trapezoid-shaped cross section, with which it is placed over frustum-shaped flanges on pipe ends. By the tightening of the clamp band with the aid of the tensioning element, which is often embodied or formed as a screw or bolt, the frustum-shaped flanges of the pipes are pulled to one another and braced against one another.

For assembly, the clamp band must be opened so that the pipe clamp can be guided past the pipe and the frustum-shaped flanges. A loss prevention is provided, which up to now has been embodied or formed as a plastic ring, so that the tensioning element is not lost in this opened state, when the tensioning element is not engaged with the second tensioning head. This plastic ring is mounted onto the tensioning element and remains there under frictional locking or even in a positive fit if the tensioning element is embodied or formed as a screw or a bolt with threading. Assembly of the loss prevention is relatively complex. In addition, the tensioning element is only secured against falling out of the first tensioning head.

SUMMARY OF THE INVENTION

Embodiments of the invention describe a simple loss prevention for the tensioning element which is still effective even after assembly.

According to embodiments, in a pipe clamp of the type generally described above, the securing element is embodied or formed as a spring element which acts between the tensioning element and the tensioning head.

This embodiment initially causes the tensioning element in the first tensioning head to be secured against a loss. However, because the securing element is embodied or formed as a spring element, it can produce a spring force between the tensioning element and the first tensioning head. Further, the spring force remains present even after assembly and the securing element is dimensioned to produce a sufficient friction between the tensioning element and the first tensioning head or the spring element such that an inadvertent loosening of the tensioning element after the removal of a tensile force on the tensioning element is prevented. Even after a completed assembly, the spring element acts on the tensioning element and produces a spring force between the tensioning element and the first tensioning head. This spring force generates, for example, a defined resistance torque in order to prevent an unintended turning of the tensioning element and the subsequent loss. If, for example, the tensioning element is no longer kept tightened in the second tensioning head, it can fall out of the second tensioning head and later out of the first tensioning head due to vibration that is caused, e.g., by a combustion engine, in a motor vehicle. On the other hand, the tightening of the tensioning element is not negatively influenced by a spring element of this type. If the tensioning element is, for example, embodied or formed as a threaded bolt, then the tightening torque is not markedly increased by the spring element. Furthermore, the spring element can be used in order to position the tensioning element against the first tensioning head. This has the advantage that the tensioning element maintains a defined position in the first tensioning head that facilitates further assembly. However, this position is not rigid with respect to the first tensioning head, since the spring element can be elastically deformed. The tensioning element can thus still be moved relative to the first tensioning head, if this should be necessary.

Preferably, the spring element is embodied or formed as a bent part. The bent part can be embodied or formed as a wire spring or as a bent metal sheet element or as a bent punched element. A wire spring essentially contains a wire that has obtained a certain form. Here, the wire can be formed from metal. However, it is also possible to use a different material. Normally, a metal wire has the advantage of a higher temperature resistance, such that a pipe clamp equipped with a metal wire spring element can, for example, be used in the region of a motor vehicle exhaust gas line. The material is adapted to the desired application. The cross section of the wire can be circular, elliptical, rectangular, quadratic, polygonal, or of any desired shape.

Preferably, the spring element aligns the tensioning element into a predetermined alignment to the first tensioning head. This alignment can, for example, be chosen so that when the pipe clamp has been guided over the pipe, the tensioning element points directly at an opening in the second tensioning head, with which opening it is to engage. In this case, it is normally necessary that the spring element aligns the tensioning element by a predetermined angularity to the tensioning element.

A further possibility is that the spring element aligns the tensioning element to the first tensioning head at a right angle. The precise alignment is adjusted to the desired application purpose.

Preferably, the spring element engages with an attachment geometry on the tensioning element. In this manner, a positive fit between the spring element and the tensioning element is produced which facilitates an axial (relative to the axis of the tensioning element) transfer of a spring force from the spring element to the tensioning element. This spring force can then be used to cause the alignment of the tensioning element with respect to the first tensioning head. A thread of a bolt, for example, can be used as an attachment geometry if the tensioning element is embodied or formed as a bolt.

Preferably, the connection geometry is embodied or formed as a circumferential groove. A circumferential groove has the advantage that the position of the angle of rotation of the tensioning element in the first tensioning head does not play a role in the assembly of the pipe clamp. The groove can thereby for example be embodied or formed such that the spring element is accommodated with a small play in the groove.

Preferably, the spring element has an accommodation space for the tensioning element that is limited by two spring clips. The accommodation space has an insertion opening and the spring clips are connected to one another by a connection bow on the side opposite to the insertion opening. This facilitates the mounting of the spring element on the tensioning element. The spring element can be slid laterally onto the tensioning element. During the sliding-on, the two spring clips are slightly spread apart from one another. They spring together when the spring element has been slid onto the tensioning element far enough so that the tensioning element is located in the accommodation space. The spring effect can be realized by the connection bow. The two spring clips can, for example, have a bulge in the region of the accommodation space.

Preferably, the connection bow is longer than a smallest distance between the spring clips. A longer connection bow is less susceptible to a plastic deformation. If the connection bow is longer than the smallest distance between the spring clips, then the risk of a damaging of the spring element during assembly is relatively low.

Here, it is preferred that the connection bow is longer than a largest distance between the spring clips in the accommodation space. Thus, the connection bow obtains a relatively large length, such that the two spring clips can be slid over the tensioning element without any problems and without the risk of a plastic deformation existing.

Preferably, the connection bow is connected to the spring clips by curved sections. In this way, the length of the connection bow can be decoupled from the distance of the spring clips in a simple manner. The curved sections, which for example form a curve of more than 90°, preferably more than 150°, can lead relatively far inwards again from the ends of the connection bow, in order to turn into the spring clips there.

Preferably, the spring clips are arranged on a first plane in the region of the accommodation space, and at least one spring clip is connected to an end section which is tilted or offset relative to the first plane. With the tilt of this end section, a situation can then be produced in a simple manner in which the spring element can produce a spring force between the tensioning head and the tensioning element. The end section then bears against the tensioning head and is deformed to a certain extent when the spring element is engaged with the tensioning element. The spring force produced thereby then causes the desired alignment of the tensioning element to the first tensioning head.

Preferably, the connection section is arranged outside the first plane. The connection section can also be used to produce a situation in which a spring force acts between the first tensioning head and the tensioning element.

Preferably, contact points of the spring element lie on the same plane, on a second plane offset in a parallel manner, or on a second plane positioned diagonally to the first plane. In this case, it is possible that the spring element bears on two positions on the first tensioning head. These two positions lie on a common plane, the second plane, which is formed by an inner contact surface of the first tensioning head. The plane on which the accommodation space is arranged determines the position of the axis of the tensioning element, because the plane of the accommodation space, the first plane, is perpendicular to the axis of the tensioning element. The predetermined angle between the first plane and the second plane then corresponds to the angle by which the angular position of the axis deviates from a right angle to the inside of the first tensioning head.

Preferably, the end section is connected to the spring clip by a spring arm, wherein the spring arm is tilted away from the tensioning head relative to the first plane. If a spring arm is used, then the springable length between the spring clip and the end section can be increased, which advantageously affects the elastic deformation of the spring element. Because the spring arm is tilted away from the tensioning head relative to the first plane, a relatively large length can be provided here.

Preferably, the spring arm extends to the connection bow from an end of the spring clip facing away from the connection bow. A relatively large length of the spring clip can also be achieved thereby.

Preferably, the spring arm extends past the accommodation space. It can even extend so far that it at least partially overlaps the curved section or even the connection bow. As a result, a very large length of the spring arm is ensured, which advantageously affects the spring properties of the spring element. The risk of a plastic deformation of the spring element, with which the desired alignment of the tensioning element relative to the first tensioning head is to be achieved, can then be kept small.

Embodiments of the invention are directed to a pipe clamp that includes a clamp band having a first end with a first tensioning head and a second end with a second tensioning head, a tensioning element guidable guided through the first tensioning head and engageable with the second tensioning head, and a securing element structured and arranged in the first tensioning head to secure the tensioning element against loss and including a spring element structured and arranged to act between the tensioning element and the first tensioning head.

According to embodiments of the invention, the pipe clamp can be a profile clamp.

In accordance with other embodiments, the spring element can be formed as bent part.

Further, the spring element may be structured and arranged to align the tensioning element in a predefined alignment to the first tensioning head.

According to embodiments of the instant invention, the tensioning element may include an attachment geometry and the spring element can be structured and arranged to engage with the attachment geometry. The attachment geometry can be formed as a circumferential groove. Further, the spring element may include two spring clips arranged to form an accommodation space for the tensioning element. The accommodation space can have an insertion opening and the spring element may further include a connection bow structured and arranged to connect the spring clips to one another on ends remote from the insertion opening. The connection bow can be longer than a smallest distance between the spring clips. Moreover, the connection bow may be longer than a largest distance between the spring clips in the accommodation space. The connection bow can also include curved sections structured and arranged to connect to the spring clips. The spring clips in a region of the accommodation space may be arranged in a first plane and the spring element can further include an end section oriented to be tilted or offset relative to the first plane and connected to at least one of the spring clips. Further, the spring element may also include a connection bow structured and arranged to connect the spring clips to one another and the connection bow can be arranged outside the first plane. The spring element may further include contact points structured and arranged to contact the first tensioning head, and the contact points lie in a plane of the first tensioning head that is one of offset and parallel to the first plane or oriented diagonally to the first plane. The spring element may further include a spring arm structured and arranged to connect the end section to the spring clip, such that the spring arm one of is tilted away from the first tensioning head relative to the first plane or coincides with the first plane. The spring arm may be further structured and arranged to extend from an end of the spring clip facing away from the connection bow to the connection bow. The spring arm may extend beyond the accommodation space.

Embodiments of the invention are directed to a method of retaining a tensioning element having a shank and a head in a pipe clamp. The method includes guiding a shank of the tensioning element structured to be received in a second tensioning head through an opening in the first tensioning head, guiding the shank through a part of a spring element, and positioning the spring element to act between the tensioning element and the first tensioning head to secure the tensioning element in the first tensioning head.

In accordance with still yet other embodiments of the present invention, the guiding of the shank through the part of the spring element comprises guiding the shank through an accommodation opening in a spring element having an opening diameter smaller than an outer diameter of the shank and the accommodation space being formed by two spring arms. Further, the tensioning element can further include an attachment geometry in a region of the head, and the method further comprises coupling the spring clips to element to the attachment geometry.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

Figure 1:
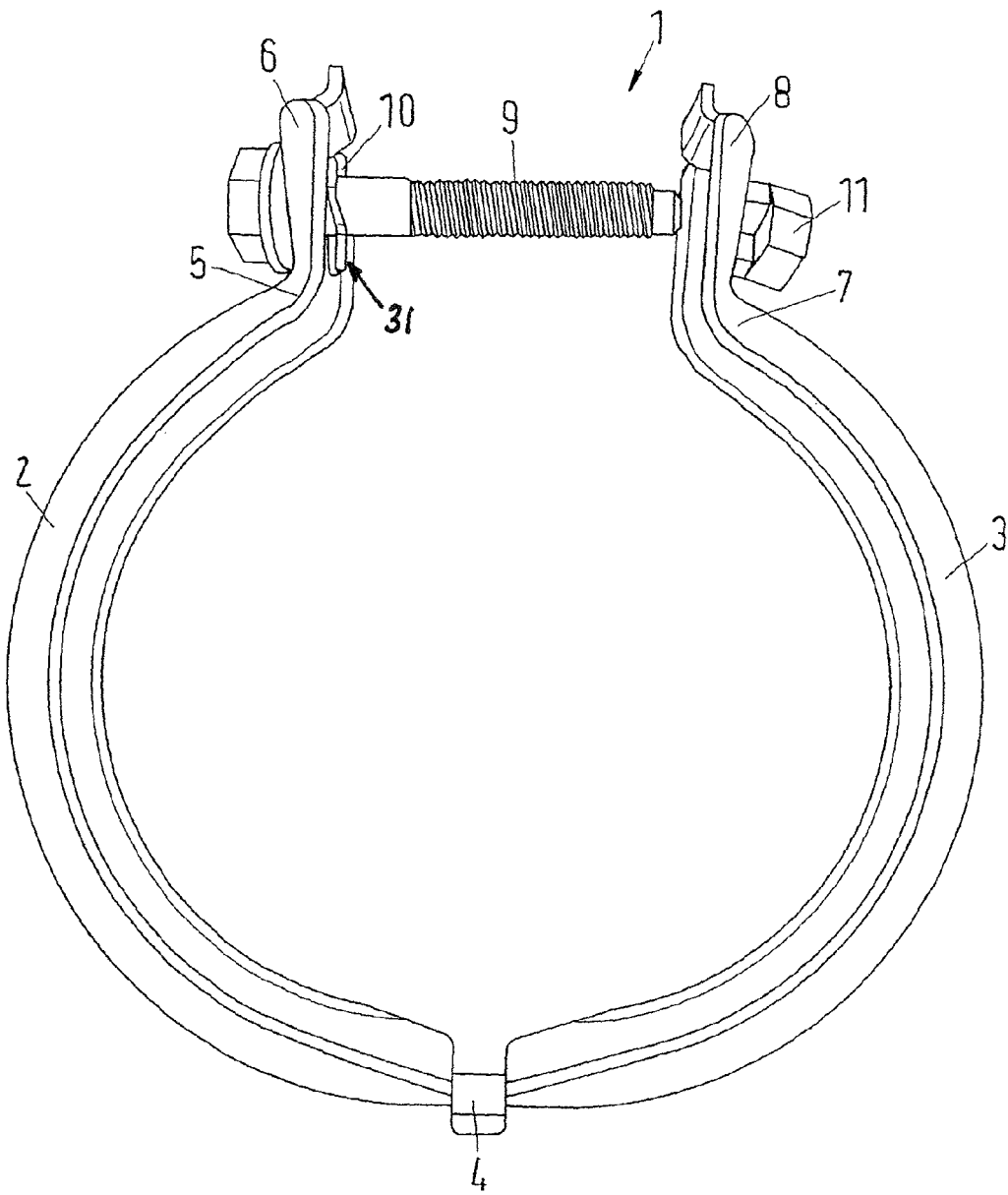
FIG. 1 shows a profile clamp in a side view.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

A pipe clamp 1, which in the exemplary case is embodied or formed as a profile clamp, has a clamp band having two half-shells 2, 3 that are connected to one another by a springable bridge 4. The two half-shells 2, 3 have roughly a trapezoid shape in cross section, as is known from profile clamps. A clamp band embodied or formed as a single piece can also be used.

First half-shell 2 has a first end 5 with a first tensioning head 6. Second half-shell 3 has a second end 7 with a second tensioning head 8. A tensioning element 9 in the form of a threaded screw is guided through first tensioning head 6. A securing element 31, which comprises a spring element 10, is engaged with tensioning element 9, as will be explained below, and acts between tensioning element 9 and first tensioning head 6. Tensioning element 9 is engageable with second tensioning head 8. A nut 11, into which nut the tensioning element 9 can be screwed in, is provided on second tensioning head 8.

For the assembly of a pipe clamp of this type, the two half-shells 2, 3 must be opened apart from one another such that, between tensioning element 9 and second tensioning head 8, an opening occurs which is large enough so that the pipe clamp 1 can be guided over a pipe on which pipe clamp 1 is to be assembled. In this regard, bridge 4 is designed so that, when the pipe clamp 1 has been positioned in its assembly location, the two half-shells 2, 3 roughly assume the position to one another as illustrated in FIG. 1. The technician then merely needs to engage tensioning element 9 with second tensioning head 8, i.e., to screw in the screw into the nut 11 in the exemplary embodiment, in order to tighten pipe clamp 1.

It can be recognized without difficulty in FIG. 1 that the two tensioning heads 6, 8 are not aligned parallel to one another in this state. This would, in and of itself, impede the threading-in of tensioning element 9 into second tensioning head 8. In the present case, however, securing element 31, which comprises spring element 10, ensures an alignment of tensioning element 9 with respect to first tensioning head 6 that is chosen so that tensioning element 9 points at nut 11 in second tensioning head 8. When pipe clamp 1 has been positioned in the desired assembly position, the technician only still needs to press the two half-shells 2, 3 together such that the two tensioning heads 6, 8 draw closer to one another. In this case, tensioning element 9 can be engaged with nut 11 on second tensioning head 8 without significant additional work, so that pipe clamp 1 can then be tightened.

FIGS. 2 through 6 illustrate further details about how an alignment of this type can be achieved.

Figure 5:
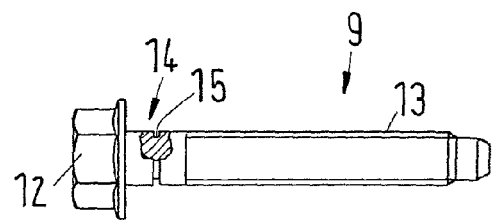
FIG. 5 shows a tensioning element.

FIG. 5 shows tensioning element 9 embodied or formed as a screw having a head 12 and a threaded section 13. Head 12 can, in a manner in and of itself known, have a torsional contact surface, e.g., an external hex or a hexagon socket.

Between head 12 and threaded section 13, an attachment geometry 14 is provided. In the exemplary case, attachment geometry 14 is embodied or formed as a circumferential groove 15. Other attachment geometries are possible, e.g., a projection between head 12 and threaded section 13.

Figure 2:
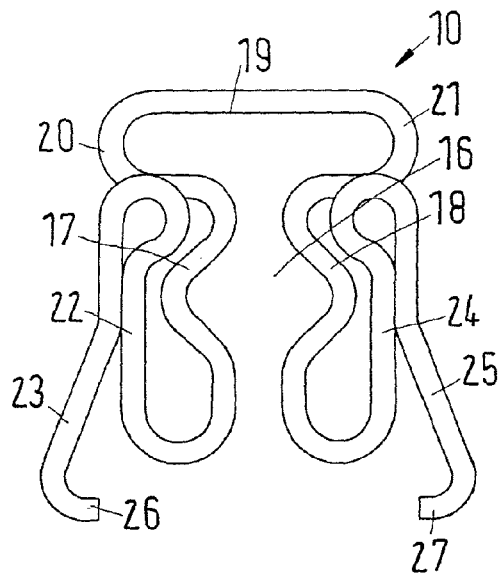
FIG. 2 shows a spring element in a top view.
Figure 3:
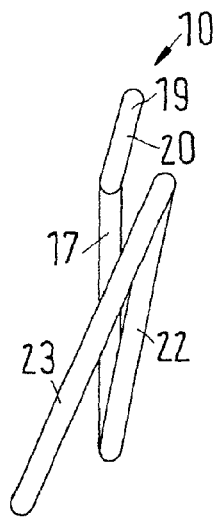
FIG. 3 shows the spring element in a side view.
Figure 4:
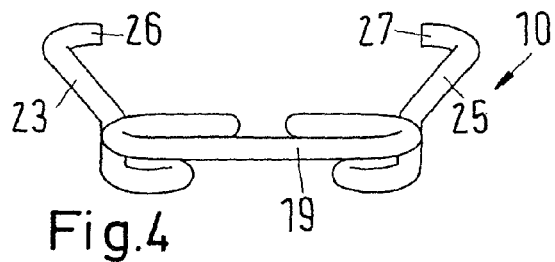
FIG. 4 shows the spring element in a front view.

Spring element 10 is illustrated in greater detail in FIGS. 2 through 4. Spring element 10 has an accommodation space 16 that is limited by two spring clips 17, 18. As shown in FIG. 3, the two spring clips 17, 18 are arranged in a plane in a region of accommodation space 16. In this plane, spring clips 17, 18 have a bulge which then forms accommodation space 16. Accommodation space 16, in a relaxed state of spring element 10, has a diameter that is somewhat smaller than a diameter of tensioning element 9 between head 12 and threaded section 13. The diameter of accommodation space 16 can correspond to the diameter of tensioning element 9 in the region of groove 15. However, it can also be slightly smaller, so that spring element 10 can be mounted on tensioning element 9 with a certain tensioning of spring clips 17, 18.

The two spring clips 17, 18 are connected to one another by a connection bow 19. Connection bow 19 turns into spring clip 17 via a curved section 20, and turns into spring clip 18 via a curved section 21. Curved sections 20, 21 extend over approx. 180°.

Connection bow 19 has a relatively large length. That is, connection bow 19 is longer than a smallest distance between spring clips 17, 18, and is even longer than a largest distance between spring clips 17, 18 in the region of accommodation space 16. The two curved sections 20, 21 can project laterally past spring clips 17, 18. The risk of a plastic deformation of connection bow 19 when spring element 10 is slid onto tensioning element 9 can thereby be kept small. Thus, the spring properties are instead preserved.

Spring clip 17 is connected to an end section 23 by a spring arm 22. Spring clip 18 is connected to an end section 25 by a spring arm 24. The two end sections 23, 25 can have inwardly bent feet 26, 27.

As can be recognized in FIG. 3, end sections 23, 25 are tilted relative to the plane on which the two spring clips 17, 18 are arranged, hereinafter referred to as the "first plane". End sections 23, 25 extend in a direction of first tensioning head 6 (see FIG. 6), so that feet 26, 27 bear against an inside, i.e., the side facing second tensioning head 8, of first tensioning head 6.

Connection bow 19 is, as recognized in FIG. 3, arranged outside of the first plane. It is offset relative to the first plane in the opposite direction of feet 26, 27. Accordingly, the two curved sections 20, 21 are tilted relative to the first plane. The tilt of curved sections 20, 21 in relation to the first plane can have a different angle than the tilt of end sections 23, 25 in relation to the first plane.

Figure 6:
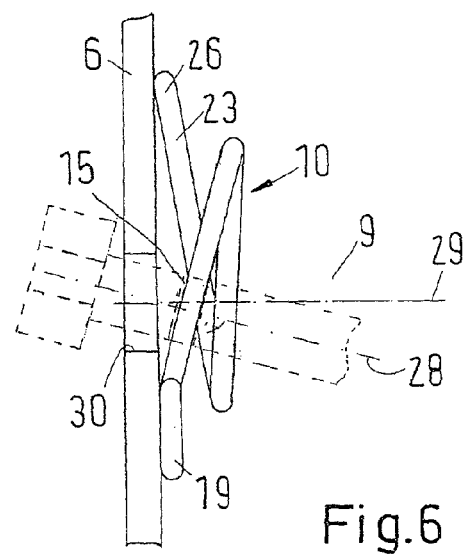
FIG. 6 shows a schematic representation for the illustration of the arrangement of spring element, tensioning element and tensioning head.

As can be recognized in FIG. 6, connection bow 19 and feet 26 lie on a common "second plane." This second plane is formed by the inside of first tensioning head 6. When, as illustrated, tensioning element 9 extends through accommodation space 16 (and spring clips 17, 18 are accommodated in groove 15), a longitudinal axis 28 of tensioning element 9 is oriented perpendicular to the first plane of spring clips 17, 18 and accommodation space 16. Because the first plane and the second plane enclose a predetermined angle to one another, longitudinal axis 28 of tensioning element 9 is oriented at this angle relative to an axis 29 of opening 30 in first tensioning head 6. Axis 29 is perpendicular to first tensioning head 6 so that tensioning element 9, as can be recognized in FIG. 1, obtains a predetermined alignment relative to the first tensioning head 6 which enables tensioning element 9 to be threaded-in into second tensioning head 8 with little effort and to then be engaged with second tensioning head 8.

Spring arms 22, 24 are, as recognized in FIG. 3, tilted with respect to the first plane, i.e., in a same direction as curved sections 20, 21. The tilt angle of spring arms 22, 24 relative to the first plane can be the same as the tilt angle of curved sections 20, 21 relative to the first plane, but, this is not absolutely necessary.

Spring arms 22, 24 extend back to connection bow 19 from an end of spring clips 17, 18 facing away from connection bow 19. In this manner, spring arms 22, 24 even extend past accommodation space 16 and can even, at least partially, overlap curved sections 20, 21. Thus, it is possible to give spring arms 22, 24 a relatively large length, which advantageously affects the spring properties of spring element 10. End sections 23, 25 can then also be made relatively long.

Figure 7:
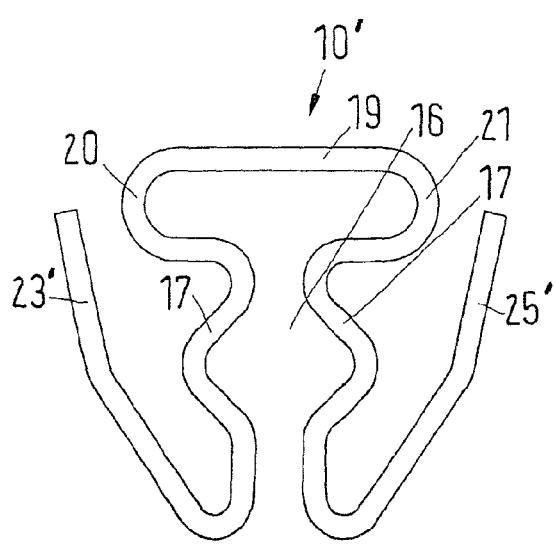
FIG. 7 shows a second embodiment of a spring element, in top view.
Figure 8:
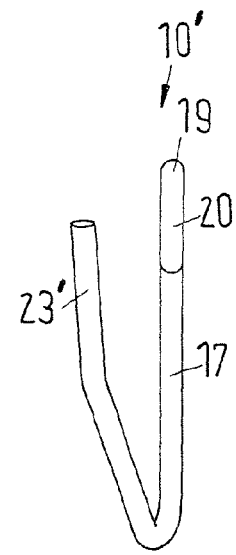
FIG. 8 shows the spring element from FIG. 7 in a side view.
Figure 9:
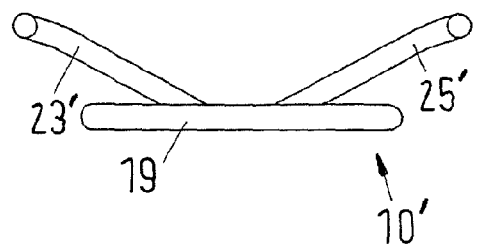
FIG. 9 shows the spring element from FIG. 7 in a front view.

FIGS. 7 through 9 show a simplified embodiment of a spring element 10', in which identical elements are provided with the same reference numerals as in FIGS. 2 through 4. In this embodiment, end sections 23', 25' are directly connected to spring clips 17, 18. With a spring element 10' of this type, it is possible to align tensioning element 9 to first tensioning head 6 roughly at a right angle. For assembly, it is then only necessary to press the ends of tensioning element 9 radially (relative to the alignment of pipe clamp 1) inwards in order to engage tensioning element 9 with second tensioning head 8. For relatively short tensioning elements 9 with a pilot point, the insertion into second tensioning head 8 is also possible without a pressing-down of tensioning element 9.

Spring element 10, 10' is embodied or formed as a wire spring. In other words, a wire having springable properties, i.e., a spring wire, bent into the shape of spring element 10, 10'. The wire can be embodied or formed as a metal wire, which is recommended if the pipe clamp is to be used at high ambient temperatures. However, the wire can also be formed from plastic or from other materials, if, e.g., the ambient temperatures at the location of use are low. The cross section of the wire can be selected as needed. In place of a spring element 10, 10' of wire, i.e., a bent wire part, a bent sheet metal part or bent punched part can also be used as a spring element.

In addition to an axial prestress, spring element 10, 10' also produces a radial prestress on tensioning element 9, relative to the axis of tensioning element 9. If tensioning element 9 is embodied or formed as a bolt, then spring element 10, 10' produces a defined resistance torque in order to prevent an inadvertent loosening of tensioning element 9. If, for example, tensioning element 9 is still engaged with threaded nut 11, the axial tension force is no longer present in a sufficient amount, so that, then vibrations, e.g., caused by a motor in a motor vehicle, can lead to tensioning element 9 being turned out of first tensioning head 6. However, this drawback would be prevented by the embodiments of the invention in that spring element 10, 10' exerts a sufficient axial or radial tension force on tensioning element 9. On the other hand, spring element 10, 10' does not hamper the assembly of tensioning element 9, as the tightening torque required for the tightening of the bolt is not significantly increased by spring element 10, 10'. Furthermore, simplifications result during assembly because tensioning element 9 can be pre-positioned within certain limits.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A pipe clamp comprising:
   a clamp band having a first end with a first tensioning head and a second end with a second tensioning head;
   a tensioning element guidable through the first tensioning head and engageable with the second tensioning head; and
   a securing element structured and arranged in the first tensioning head to secure the tensioning element against loss and comprising a spring element structured and arranged to act between the tensioning element and the first tensioning head,
   wherein the spring element comprises two spring clips arranged to form an accommodation space for the tensioning element.

2. The pipe clamp according to claim 1, being a profile clamp.

3. The pipe clamp according to claim 1, wherein the spring element is formed as bent part.

4. The pipe clamp according to claim 1, wherein the spring element is structured and arranged to align the tensioning element in a predefined alignment to the first tensioning head.

5. The pipe clamp according to claim 1, wherein the tensioning element comprises an attachment geometry and the spring element is structured and arranged to engage with the attachment geometry.

6. The pipe clamp according to claim 5, wherein the attachment geometry is formed as a circumferential groove.

7. The pipe clamp according to claim 1, wherein the accommodation space has an insertion opening and the spring element further comprises a connection bow structured and arranged to connect the spring clips to one another on ends remote from the insertion opening.

8. The pipe clamp according to claim 1, wherein the connection bow is longer than a smallest distance between the spring clips.

9. The pipe clamp according to claim 8, wherein the connection bow is longer than a largest distance between the spring clips in the accommodation space.

10. The pipe clamp according to claim 8, wherein the connection bow comprises curved sections structured and arranged to connect to the spring clips.

11. The pipe clamp according to claim 1, wherein the spring clips in a region of the accommodation space are arranged in a first plane and the spring element further comprises an end section oriented to be tilted or offset relative to the first plane and connected to at least one of the spring clips.

12. The pipe clamp according to claim 11, wherein the spring element further comprises a connection bow structured and arranged to connect the spring clips to one another and the connection bow is arranged outside the first plane.

13. The pipe clamp according to claim 12, wherein the spring element further comprises contact points structured and arranged to contact the first tensioning head, and the contact points lie in a plane of the first tensioning head that is one of offset and parallel to the first plane or oriented diagonally to the first plane.

14. The pipe clamp according to claim 13, wherein the spring element further comprise a spring arm structured and arranged to connect the end section to the spring clip, wherein the spring arm one of is tilted away from the first tensioning head relative to the first plane or coincides with the first plane.

15. The pipe clamp according to claim 14, wherein the spring arm is further structured and arranged to extend from an end of the spring clip facing away from the connection bow to the connection bow.

16. The pipe clamp according to claim 15, wherein the spring arm extends beyond the accommodation space.

17. A method of retaining a tensioning element having a shank and a head in a pipe clamp, comprising:
   guiding a shank of the tensioning element structured to be received in a second tensioning head through an opening in the first tensioning head;
   guiding the shank through a part of a spring element, which comprises two spring clips arranged to form an accommodation space for the shank; and
   positioning the spring element to act between the tensioning element and the first tensioning head to secure the tensioning element in the first tensioning head.

18. The method according to claim 17, wherein the guiding of the shank through the part of the spring element comprises guiding the shank through an accommodation opening in a spring element having an opening diameter smaller than an outer diameter of the shank and the accommodation space being formed by two spring arms.

19. The method according to claim 18, wherein the tensioning element further includes an attachment geometry in a region of the head, and the method further comprises coupling the spring clips to the attachment geometry.

\* \* \* \* \*